April 22, 1952     R. A. NECCHI     2,594,202
WHEEL ROTATOR
Filed April 14, 1948
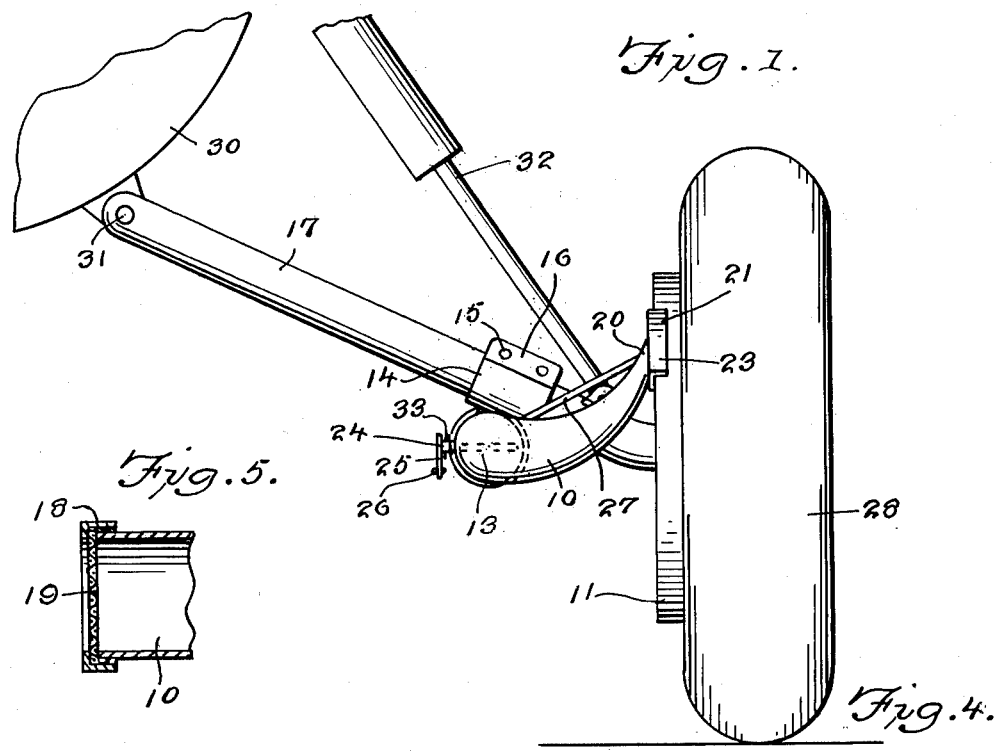
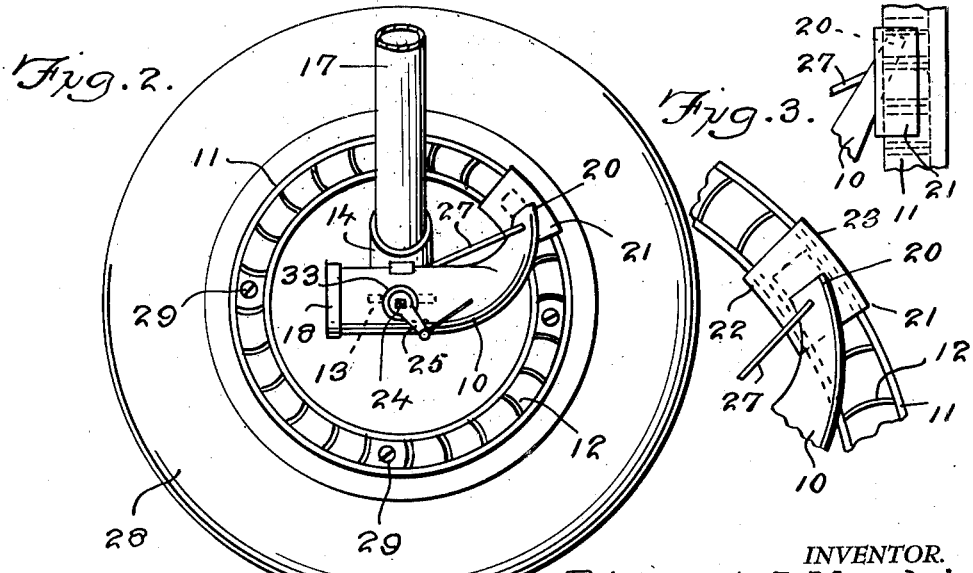
INVENTOR.
Richard A. Necchi
BY *Victor J. Evans & Co.*
ATTORNEYS Patented Apr. 22, 1952

2,594,202

UNITED STATES PATENT OFFICE 2,594,202

WHEEL ROTATOR

Richard Anthony Necchi, Hingham, Mass.

Application April 14, 1948, Serial No. 21,030

1 Claim. (Cl. 244—103)

1

This invention relates to landing gear of aircraft wherein wheels with pneumatic tires are carried by retractable or rigid supports, and in particular an air scoop mounted on the wheel support and having an arcuate restricted end forming a nozzle through which the air is discharged against fins on the wheel to rotate the wheel.

The purpose of this invention is to provide means for harnessing air passing by the wheels of landing gear of aircraft, in landing, and utilizing the air harnessed thereby for starting the wheels to rotate as the plane approaches the ground to reduce wear on the tires.

Attempts have been made to actuate the wheels of aircraft with the air through which the wheels pass and although these operate with a certain degree of efficiency they add unnecessary weight and reduce the efficiency of the aircraft. With this thought in mind this invention contemplates a comparatively small horn-shaped scoop mounted adjacent the hub of a wheel with the small end positioned to discharge the air collected therein against a ring of vanes on the wheel.

The object of this invention is, therefore, to provide means for rotating the wheels of aircraft landing gear as the aircraft lands by the air through which the aircraft is passing which adds very little to the weight of the aircraft and which does not decrease the efficiency thereof.

Another object of the invention is to provide an attachment for aircraft that rotates the wheels of the landing gear thereof as the aircraft lands, which may be attached to substantially any aircraft without changing the design thereof.

A further object of the invention is to provide an attachment that may readily be mounted on aircraft for causing the wheels of the landing gear thereof to rotate as the aircraft lands which is of a simple and economical construction.

With these and other objects and advantages in view the invention consists of the new and novel combination, construction, and arrangement of parts as hereinafter more fully described, set forth in the claim appended hereto, and disclosed in the accompanying drawings forming part hereof, wherein:

Figure 1 is a view showing a rear elevation of a wheel of an airplane illustrating the air scoop mounted on the wheel support with parts of the supports broken away.

Figure 2 is a side elevational view of a wheel with a supporting strut thereof broken away and with the air scoop mounted on the strut and

2 positioned to discharge air against vanes in a ring on the wheel.

Figure 3 is a detail view showing the air discharge nozzle of the air scoop and vane ring of the wheel on an enlarged scale and with parts broken away.

Figure 4 is a detail view looking toward one side of the air discharge nozzle with parts broken away.

Figure 5 is a longitudinal section through the inlet end of the air scoop showing the screen therein, and with parts broken away.

Referring now to the drawings wherein like reference characters denote corresponding parts the air scoop for rotating wheels of landing gear of aircraft includes a horn-shaped casing 10, a ring 11 having vanes 12 therein, and a damper or valve 13.

The casing 10 is provided with a clamp 14 that is held by bolts 15 through flanges 16 on a strut 17 of the wheel support, and the large or inlet end of the casing is provided with a cap 18 that holds a wire mesh screen 19 over the end to prevent leaves, stones and the like entering the casing. The opposite or small end of the casing is provided with a nozzle 20 that extends into a shoe 21 which is formed with overlapping flanges 22 and 23 at the sides that extend over the sides of the ring 11 to hold air in contact with the vanes 12.

The valve 13 is mounted on a shaft 24 that is pivotally held in the casing 10 and the outer end of the shaft carries an arm 25 that is actuated by a rod 26 to operate the valve 13 to regulate the flow of air through the scoop. A rod 27 supports the nozzle at the end of the casing from the clamp 14, as shown in Figure 1, and the ring 11 is mounted on the inner surface of a wheel 28 by bolts 29. The strut 17 is illustrated as being attached to the fuselage 30 of an aircraft by a bolt 31 and the outer end of the strut is supported by a resilient brace 32, however, it will be understood that the device may be mounted on the aircraft in any suitable manner or by any means.

The valve 13 is in the form of a butterfly valve and the rod 26 by which it is opened may be extended to the cock-pit and operated by any suitable means. The shaft 24 may be provided with a spring 33, as shown in Figure 2, which holds the disc of the valve in the closed position until it is actuated by the rod 26.

With the parts arranged in this manner air will be arrested by the large end of the casing and as it is forced out of the nozzle at the small end it will impinge the vanes 12 and cause the wheel to rotate, wherein the shock of the stationary wheels striking the ground will be substantially eliminated and the life of the tires will be extended.

It will be understood that other modifications may be made in the design and arrangement of the parts without departing from the spirit of the invention.

What is claimed is:

In an air actuated airplane wheel rotating device, the combination which comprises an airplane having a wheel journaled on the end of a strut, a ring channel shaped in cross section and having transversely disposed arcuate vanes therein positioned on the inner face of the wheel, a horn shape casing having a large entrance end and a small outlet end carried by the strut and suspended with the large end facing the leading end of the airplane and with the small end positioned to discharge air received by the large end in a forwardly direction against the vanes of the channel shape ring whereby the air discharged thereby rotates the wheel in the direction of travel of the airplane, a substantially rectangular shaped shoe having the opposite longitudinal edges thereof slightly curved positioned over the small end of the horn shaped casing, flanges on the opposite longitudinal edges of the shoe extended over the channel shaped ring for retaining air discharged by the horn shape casing in close proximity to the vanes, and means regulating the amount of air passing through the said horn shape casing.

RICHARD ANTHONY NECCHI.

REFERENCES CITED

The following references are of record in the file of this patent:

UNITED STATES PATENTS

| Number | Name | Date |
| --- | --- | --- |
| 1,735,675 | Danckwart | Nov. 12, 1929 |
| 2,370,316 | Juul | Feb. 27, 1945 |
| 2,372,207 | Kendrick | Mar. 27, 1945 |
| 2,378,319 | Olson | June 12, 1945 |
| 2,389,525 | Manheim | Nov. 20, 1945 |